W. A. Sweet,
Scroll Saw,
No. 34,078.    Patented Jan. 7, 1862.
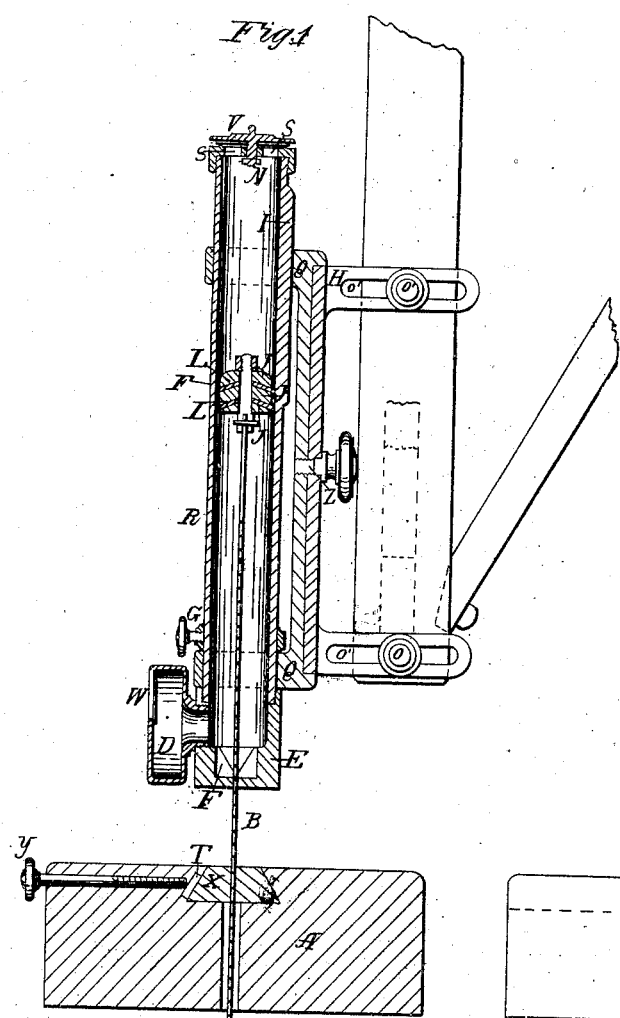
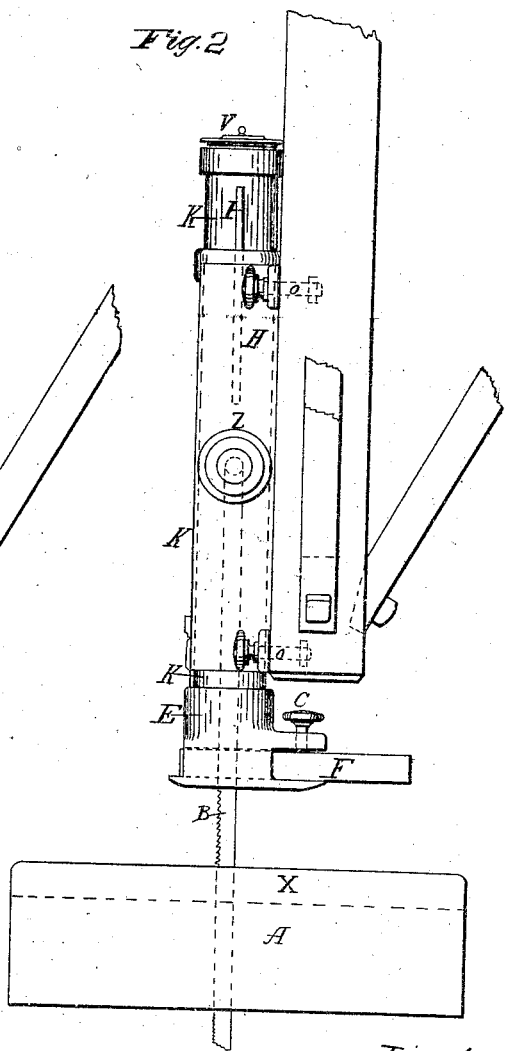
Witnesses:
Inventor:
William A. Sweet

UNITED STATES PATENT OFFICE.

WILLIAM A. SWEET, OF SYRACUSE, NEW YORK.

IMPROVEMENT IN SCROLL-SAWS.

Specification forming part of Letters Patent No. 34,078, dated January 7, 1862.

*To all whom it may concern:*

Be it known that I, WILLIAM A. SWEET, of the city of Syracuse, county of Onondaga, and State of New York, have invented certain new and useful Improvements in Scroll-Saws; and I do hereby declare and ascertain the same, reference being had to the accompanying drawings, in which—

Figure 1 is a front view of the saw and its attachments, and Fig. 2 is a side view of the same.

The letters in each figure refer to like parts in both.

In sawing curved lines experience has shown that it is necessary to use a very narrow saw, and that when made sufficiently narrow for accurate work it becomes so frail as to be exceedingly liable to break. I have only been able to overcome this difficulty by attaining great perfection in the mechanical arrangement by which the saw is propelled and supported and by securing the greatest possible delicacy in the vertical strain on the saw while in operation. It is necessary to run scroll-saws with great rapidity, and I consequently find it necessary to make the attachment with the least possible weight. For sawing scroll-work in long pieces it is frequently necessary that all connection of the upper end of the saw with the floor by any sort of frame-work should be avoided; also, for rapid working it is necessary that the sawdust should be instantly removed, in order that the eye of the operator may follow the lines with rapidity and accuracy.

My improved scroll-saw combines all of these necessary elements in one machine, and which I will now more fully describe in the words and figures following, to wit:

I construct any convenient form of brace-work from the ceiling overhead, by which I suspend the cylinder K directly over the table A. The said cylinder K supports and guides the upper end of the saw by a light head fitting loosely inside of the cylinder and attached to the upper end of the saw B. The upper end of the said cylinder is closed, except a small valve V, opening upward for the escape of any air that might pass the said head in its downward movement; but the said head is not intended to be so loose as to leak much, if any. The lower end of the saw is supported in the mortise through the bed of the table by the stay-piece, which is fitted snugly in the bed of the table and can be moved by a light stroke of a hammer on its outer end, so as to cause its opposite end to press against the back edge of the saw and afford it constant support in that direction, and thereby avoid the possibility of breaking the saw by the pressure of the stuff being fed up to the saw with any reasonable speed and force. The lower end of the saw is attached to a cross-head on the under side of the table, and to this cross-head is attached a pitman propelled in the usual manner.

On the side of the cylinder and near its lower end is a small valve W, opening inwardly into a small wind-chest D, which opens into the lower end of the cylinder K. The object of this arrangement is to admit air, to be forced down through the lower end of the cylinder to blow away the sawdust from the lines on the work.

The slide F through the lower end of the head E forms the bottom of the cylinder K and also supports the saw B above the work and can be adjusted so as to press lightly against the back of the saw and is held in position by the set-screw C.

The saw is supported immediately below the work by the slide-piece X, which is held in position by the gib T and set-screw Y.

B is the saw, passing up through the slide-piece X and through the slide F and its upper end attached to the saw-head, which is composed of two circular pieces of leather L L, supported by three pieces of wood J J J. All of these five parts form one head and are held together by a bolt passing up through them and a nut on the top, and the lower end of this bolt is made in the shape of a jaw, in which the upper end of the saw is fastened.

During the upward movement of the saw the valve V permits any air that may be in the cylinder over the saw-head to escape through the hole S S. When the downward movement of the saw commences, a partial vacuum is instantly created between the saw-head and upper end of the cylinder, which strains the saw perfectly. It is necessary that the saw B should be kept perpendicular laterally to the table A, and to adjust its position in that direction the cylinder K is attached to its frame-work support by two arms, which are attached by set-screws O O. These set-screws pass through slots O' O' in the said arms to permit the said lateral adjustment of the saw, and the cylinder K is so attached at or near its center to the said arms by a set-screw Z as to admit of its being adjusted forward and back in such a manner as to increase or diminish the rake or cut of the saw, as may be desired. The attachments are also so arranged that they may be free to slide up and down, so that by its own weight its lower end will constantly rest upon the stuff being sawed and then form a yielding "hold down" that will follow uneven surfaces. This is attained by embracing the cylinder with the rings Q Q, in one of which is a slight groove in which the feather I on the side of the cylinder slides, which prevent the cylinder from jarring around out of place.

G is a ring around the cylinder, with a set-screw, by which the cylinder while at any required height may be kept from falling below it and at the same time left free to rise higher when necessary. For illustration, suppose we wish to saw stuff of uneven thickness and the thinnest part of which is one inch thick. We set the ring G so as to drop the lower end of the cylinder to within about seven-eighths of an inch of the table. The cylinder could rise and fall to the varying thickness of the stuff, and by its own weight and the atmospheric pressure on its top the stuff is held down to the table.

Having thus fully described my improvements in scroll-saws, what I claim as new, and desire to secure by Letters Patent, is—

1. The combination of the adjustable cylinder K, the valve, and wind-chest D, the valve V, the saw head F, the saw B, and the adjustable slides F and X, substantially as and for the purposes described.

2. The loose cylinder K, when adjusted, substantially as specified, so as to form a yielding hold down upon the stuff both by its own weight and atmospheric pressure, for the purposes substantially as described.

3. Attaching the cylinder K by the set-screw Z in order to obtain a rake adjustment, substantially as set forth.

4. Combining the cylinder K (inclosing the saw-head) with the auxiliary frame-work and A, while the other or outer end is made of any set-screw Z or its equivalent, and slotted arms O' O' and set-screws O O, for the purpose of attaining both a lateral and rake adjustment of the saw, substantially as and for the purposes described.

WILLIAM A. SWEET.

Witnesses:
  ANDREW J. SMITH,
  M. G. HUBBARD.